United States Patent [19]

Deal et al.

[11] Patent Number: 4,498,911
[45] Date of Patent: Feb. 12, 1985

[54] SIMULTANEOUS REMOVAL OF WATER AND HYDROGEN SULFIDE FROM GASEOUS CARBON DIOXIDE

[75] Inventors: Carl H. Deal; A. John Flynn, both of Houston, Tex.

[73] Assignee: Shell Oil Company, Houston, Tex.

[21] Appl. No.: 508,778

[22] Filed: Jun. 29, 1983

[51] Int. Cl.³ .............................................. B01D 53/14
[52] U.S. Cl. ............................................ 55/32; 55/73
[58] Field of Search ........................ 53/32, 40, 73, 68

[56] References Cited

U.S. PATENT DOCUMENTS

| | | | |
|---|---|---|---|
| 3,435,590 | 4/1969 | Smith | 55/73 X |
| 3,533,732 | 10/1970 | Moore et al. | 55/73 X |
| 3,702,296 | 11/1972 | Arnold et al. | 55/73 X |
| 4,242,108 | 12/1980 | Nicholas et al. | 55/40 |
| 4,302,220 | 11/1981 | Volkamar et al. | 55/32 |

FOREIGN PATENT DOCUMENTS 2035123  6/1980  United Kingdom ................... 55/73

Primary Examiner—Charles Hart
Attorney, Agent, or Firm—John M. Duncan

[57] ABSTRACT

The present invention is an improved process for simultaneously removing $H_2O$ and $H_2S$ from gas streams containing predominantly $CO_2$. The process comprises:
(a) contacting the gas feed stream in an absorption zone with a diethylene glycol, triethylene glycol and/or tetraethylene glycol absorbent to produce a $CO_2$-rich gas and a loaded $H_2S$-rich liquid absorbent;
(b) flashing the loaded absorbent to remove a major portion of the $CO_2$ which is recycled to the absorber;
(c) flashing the semi-loaded solvent at least once, and preferably two or more times, to remove a major portion of the $H_2S$, to produce a semi-lean absorbent; and
(d) regenerating the semi-lean absorbent and returning same to the absorption zone.

10 Claims, 1 Drawing Figure

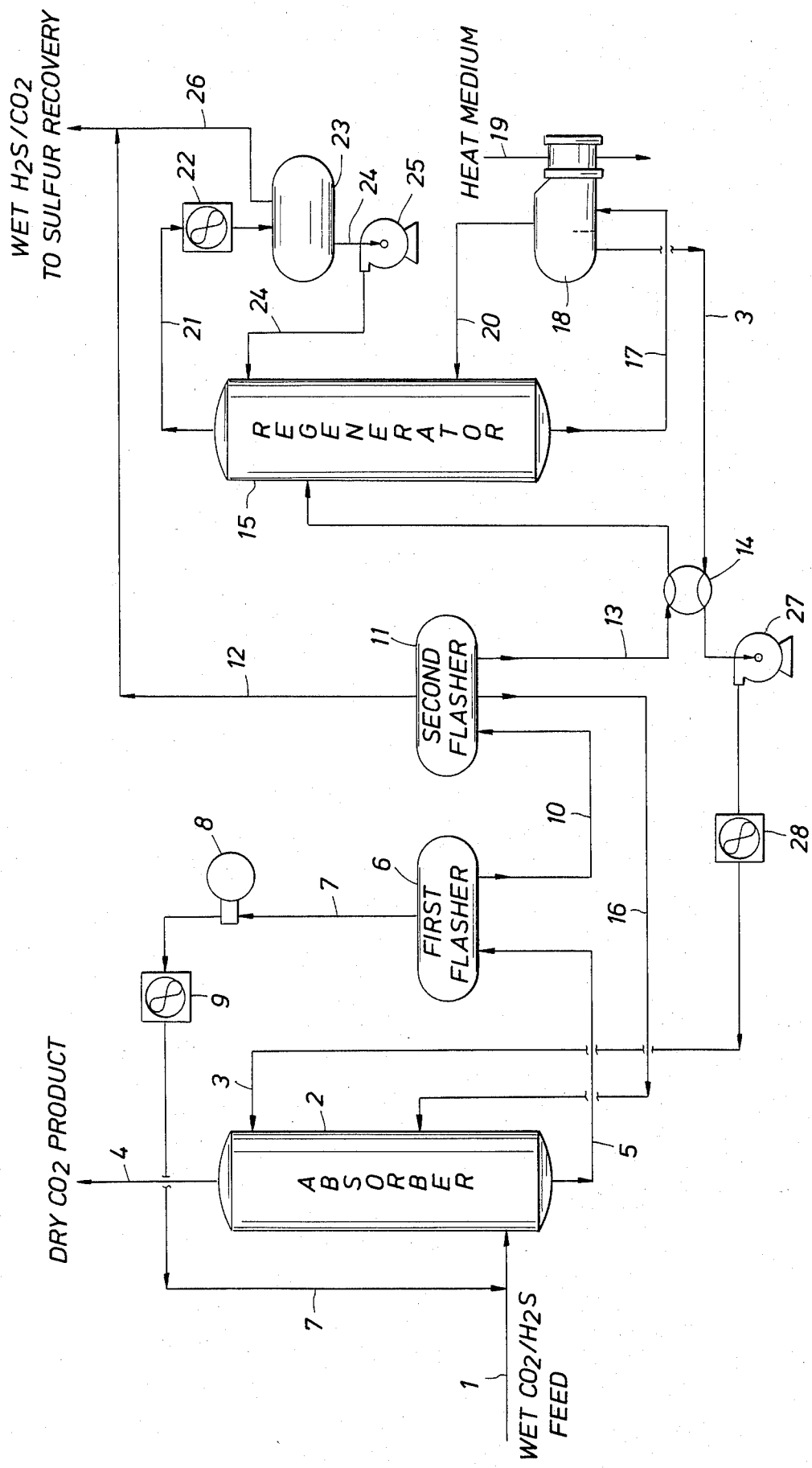

SIMULTANEOUS REMOVAL OF WATER AND HYDROGEN SULFIDE FROM GASEOUS CARBON DIOXIDE

BACKGROUND OF THE INVENTION

1. Field of the Invention

This invention relates to a process for removing water and hydrogen sulfide from gas streams containing predominantly carbon dioxide. More particularly, the invention relates to the selective removal of $H_2O$ and $H_2S$ from streams containing large quantities of $CO_2$ with a particular solvent.

2. Description of the Prior Art

Mixtures of $H_2S$ with other gases, such as $CO_2$ and methane, are found in a number of industries. For example, mixtures of $H_2S$, $CO_2$, water, and methane are found as natural gases. It is frequently necessary to remove $H_2S$ from gas mixtures for the purpose of purifying the gas mixture or recovering the $H_2S$ or both. For example, it is often necessary to purify a gaseous hydrocarbon stream to produce sweet, dry gas which will not poison certain catalysts and will meet the usual pipeline specifications, and it is sometimes advantageous to recover the $H_2S$ as a source of elemental sulfur. Furthermore, in the treatment of gas mixtures containing both $H_2S$ and $CO_2$ the removal of $H_2S$ facilitates the subsequent recovery of pure $CO_2$. In such processes it is frequently advantageous to selectively separate the $H_2S$ from the other gases comprising the mixture, thus making possible the use of smaller capacity equipment for the subsequent treatment of the separated gas. In particular, in the separation of $H_2S$ from sour natural gas, economies can be realized by selectively removing the $H_2S$ with as little as possible of the carbon dioxide.

One process to selectively remove $H_2S$ from streams containing $H_2S$ and $CO_2$ is disclosed in U.S. Pat. No. 3,362,133. In the '133 patent the gas feed is contacted with a liquid solvent comprising a normally liquid dialkyl ether of a polyalkylene glycol. A specific solvent employed therein is the dimethyl ether of a polyethylene glycol such as diethylene glycol or triethylene glycol. This process is practiced commercially and is known as the Selexol process. The Selexol process has certain advantages for removing small amounts of $H_2S$ and $CO_2$ from other gases as a result of its high solvency for $H_2S$ and $CO_2$ and relatively poor solvency for other gases such as methane. These advantages included notably the use of a relatively low solvent flow. It may also be used to remove $H_2S$ from streams high in $CO_2$ content. However, this process has certain disadvantages for removing $H_2S$ from gases high in $CO_2$ in the absence of a substantial level of methane. In this case, particularly at high $CO_2$ pressures, the solvent may be totally miscible with the gas and consequently its use gives rise to no separation unless the pressure is lowered to a level at which the system is not miscible in all proportions. The latter requires additional compression of the product $CO_2$ to the high (supercritical) pressures normally used for transport by pipeline.

A new process has been found for selectively removing $H_2S$ from gas streams, containing predominantly $CO_2$ and $H_2S$, at high pressures without excessive loss of solvent, as with the Selexol process.

SUMMARY OF THE INVENTION

The present invention is an improved process for simultaneously removing $H_2O$ and $H_2S$ from a stream containing predominantly $CO_2$, which process comprises:

(a) countercurrently contacting said gas stream at elevated pressure in an absorption zone with a physical solvent selected from the group consisting of diethylene glycol, triethylene glycol, tetraethylene glycol and mixtures thereof, therein producing an unabsorbed $CO_2$-rich gas and a loaded $H_2S$-rich liquid absorbent solution;

(b) passing said loaded absorbent solution to a first flashing zone maintained at a pressure below the partial pressure of the $CO_2$ present in said loaded absorbent solution at the temperature present in said first flashing zone, therein liberating a gas stream comprising a major portion of relatively dry $CO_2$ and a minor portion of the $H_2S$ present in said loaded absorbent solution, producing a semi-loaded absorbent solution, compressing and recycling said gas stream to said absorption zone;

(c) passing said semi-loaded absorbent solution to at least one additional flashing zone maintained at a pressure lower than that of the preceding flashing zone at the temperature in said flashing zone, therein liberating a gas stream comprising a major portion of the $H_2S$ and a minor portion of the $CO_2$ present in said semi-loaded absorbent solution and producing a semi-lean absorbent solution; and (d) passing said semi-lean absorbent solution to a regeneration zone, therein further separating $H_2S$ and $CO_2$ from said semi-lean absorbent solution, and returning the resulting lean absorbent solution to said absorption zone.

Optionally the semi-lean absorbent from the second flashing zone in step (c) may be passed to a third, and fourth flashing zones wherein the pressures are further reduced in each step to remove additional $H_2S$ and $CO_2$ from the absorbent. In the case of more than two flash zones the gases from all except the last flashing zone are compressed and returned to the absorber. The gas from the last flashing zone contains a major portion of the $H_2S$ and is generally routed to sulfur recovery.

The present invention has a number of advantages over the prior art. One significant advantage is that the selective removal of the $H_2S$ from the feed stream takes place at elevated pressure, e.g., 1200 psig, thus significantly reducing the horsepower necessary to recompress the gas stream to the high pressures normally used for transport by pipeline. Other advantages include the simultaneous removal of water from the gas stream and a reduced loss of solvent to the high pressure $CO_2$ exiting the process.

BRIEF DESCRIPTION OF THE DRAWING

The drawing represents a schematic flow diagram illustrating an apparatus suitable for carrying out the invention described herein.

DETAILED DESCRIPTION OF THE INVENTION

The gaseous feed stream treated according to the present invention is preferably a high (>90% mol) $CO_2$ content stream. Preferred compositions expressed in percent by volume are:

|  | Preferred | More Preferred |
|---|---|---|
| $CO_2$ | 90% to 99.5% mol | 95 to 99.5% mol |

-continued

| | Preferred | More Preferred |
|---|---|---|
| $H_2S$ | .01% to 5% mol | 0.005 to 2% mol |
| $C_1$ | 0 to 5% mol | 0 to 1% mol |
| $N_2$ | 0 to 5% mol | 0 to 1% mol |

The physical solvent employed in selectively removing the $H_2S$ is selected from the group consisting of diethylene glycol, triethylene glycol, tetraethylene glycol and mixtures thereof. A preferred solvent is triethylene glycol.

The gas mixture is contacted with the solvent in a contacting zone, e.g., an absorption column having about 6 to 10 equilibrium stages. This may be accomplished with, e.g., valve trays, bubble cap trays, baffle trays, packing and the like. The solvent circulation ratio may vary, but is generally in the range of about 20 to 50 gallons per minute per million standard cubic feet per day of gas treated, depending upon the $H_2S$ content of the inlet gas and the degree of $H_2S$ removal desired.

The absorption column is operated at elevated pressures, such as 1000 to 2000 psig, and preferably 1200 to 1400 psig. The high pressure employed herein is advantageous since it reduces significantly the horsepower necessary to compress the gases to the high pressure normally used for pipeline transport, thus resulting in appreciable capital cost and energy savings advantages.

The pressure in the first flashing zone may vary between about 300 to 600 psig, and the pressure in the second flashing zone may be between about 100 to 250 psig. Generally the pressure of each succeeding flashing stage is somewhere about ⅓ the pressure of the preceding stage. In this way the compression ratio required to elevate the pressure to that of the preceding stage does not exceed about 3 to 1.

If desired, third and fourth flashing zones may be employed to further reduce the $H_2S$ and $CO_2$ in the absorbent solution. The pressure in the third zone will generally vary between about 40 to 80 psig. The pressure in the fourth zone will generally vary between about 15 to 35 psig.

An important aspect of the present invention is that the physical solvent employed herein has a much greater selectivity to $H_2S$ at, e.g., 1200 psig, than does Selexol and similar process solvents. This is shown in the Examples below.

The temperature during the contacting of the gas mixture and the solvent in step (a) may vary between wide limits. Temperatures of from 100° to 150° F. are preferred. More preferred temperatures are 115° to 130° F.

In the absorption step (a) of the process described in the Summary, most of the $H_2S$ is absorbed by the solvent along with some $CO_2$. The resulting unabsorbed gaseous stream comprising predominantly $CO_2$, typically with less than 25 ppm $H_2S$, may be employed, e.g., for $CO_2$ injection in tertiary oil recovery operations.

The loaded solvent from step (a) contains besides $H_2S$ and $CO_2$, small amounts of dissolved non-acid components, e.g., hydrocarbons and/or hydrogen and/or carbon monoxide. The loaded solvent is then passed to a first flashing zone in step (b). The first flashing zone is maintained at a pressure lower than the partial pressure of the $CO_2$ present in the loaded solvent. In this way the non-acid gases, a major portion of the $CO_2$ and a minor portion of the $H_2S$ are flashed or liberated. This liberated gaseous stream is compressed, cooled and recycled to the absorption zone. In a preferred embodiment, greater than 50 percent of the $CO_2$ present in the loaded solvent and less than 10 percent of the $H_2S$ present in the loaded solvent is recycled. The non-flashed solvent is termed a semi-loaded solvent and is passed to a second flashing zone.

In step (c) the semi-loaded solvent is flashed at pressures as low as about 25 psig and at temperatures from 50° to about 150° F., therein liberating the bulk or major portion of the $H_2S$ present in said semi-loaded solvent. In a preferred embodiment greater than 50 percent of the $H_2S$ present in the semi-loaded solvent is flashed or liberated. This $H_2S$-rich gaseous stream is then routed to a sulfur recovery unit such as a Claus unit. The flashed solvent obtained in step (c) is termed semi-lean solvent and is passed to a regeneration step.

In step (d), a portion of the semi-lean solvent is regenerated by contact with steam and/or heat. The regeneration is very suitably carried out by heating in a regeneration column at a temperature of from 300° to 350° F. Preferably, use is made of a reboiler supplied with a heat medium source. The gaseous stream liberated in the regeneration comprises $CO_2$ and $H_2S$ and is typically routed to sulfur recovery. The regenerated solvent or lean solvent is then routed to the absorption zone after cooling.

In a preferred embodiment a portion of the semi-lean solvent obtained in step (c) is routed to the absorption zone. In this way the bulk of acid gas removal is accomplished without having to strip the semi-lean solvent to very low $H_2S$ levels.

DETAILED DESCRIPTION OF THE DRAWING

The invention is further illustrated by reference to the accompanying drawing, which is given for the purpose of illustration only and is not meant to limit the invention to the particular reactants and conditions employed therein.

Referring to the drawing, a feed stream 1 comprising about 90+% volume $CO_2$, 0.05-5% volume $H_2S$ and small amounts of $CH_4$, $N_2$ and $H_2O$ is routed to an absorption column, or absorber 2, where it is contacted with a lean solvent introduced via line 3. The lean solvent comprises diethylene glycol, triethylene glycol or tetraethylene glycol or mixtures thereof, containing up to about 5% water. Purified dry $CO_2$ gas containing less than 20 ppm $H_2S$ leaves absorber 2 via line 4. This stream can then be routed to a pipeline or to a field for tertiary oil recovery. The loaded solvent leaves the absorber via line 5 and is routed to a first flashing zone 6. The first flasher 6 is typically maintained at a pressure of about 400 to 500 psig. The flashed gas containing mainly $CO_2$ is routed via line 7 to a compressor 8. The compressed gas is then cooled by, e.g., air coolers 9 before being recycled to the absorber 2. The semi-loaded solvent is routed via line 10 to a second flashing zone 11. The second flasher 11 is typically maintained at a pressure of about 25 to about 100 psig. The liberated or flashed gas containing mainly $H_2S$ is then routed via line 12 to sulfur recovery facilities not shown in the drawing. The resulting semi-lean solvent is then typically routed via line 13 and heated via heat exchange with lean solvent in exchanger 14 before routing to a regeneration zone 15. In a preferred embodiment a major portion (between about 70 and 90 percent weight) of the semi-lean solvent is routed via line 16 back to the middle part of absorber 2. In the regenerator 15, liquid is withdrawn from the bottom via line 17 and is heated in reboiler 18 with heat medium and the heated vapors are returned to the regeneration zone via line 20. Lean solvent is routed via line 3 and heat exchanged with semi-lean solvent in exchanger 14. Next the lean solvent is pumped (pump 27) and cooled (air cooler 28) before return to the top stage of the absorber 2. Regenerator overhead gas (line 21) is cooled via air cooler 22 and routed to a separator vessel 23. A reflux stream is routed back to the regenerator 15 via line 24 and pump 25. The gaseous overhead stream comprising wet $H_2S$ and $CO_2$ is then routed via line 26 to sulfur recovery facilities.

The invention will now be further clarified by a consideration of the following examples, which are intended to illustrate the invention and are not to be regarded as a limitation thereof.

EXAMPLE I

A series of tests was made to measure the selectivity of Selexol solvent and triethylene glycol (TEG) for $H_2S$ removal from $CO_2$. These data were obtained at temperatures ranging from 31° C. to 44° C. and pressures between 790 and 1200 psia.

$CO_2$ samples containing less than 1 weight percent $H_2S$ were prepared in a stainless steel cylinder and then introduced into a Jerguson gauge containing the solvent. A band stirrer was used in the inclined vessel to assure thorough agitation of the sample. A stable temperature was maintained by heating coils passed through a thermostated bath. Samples from each phase were carefully bubbled through 3N $H_2SO_4$ to assure quantitative release of $CO_2$ and $H_2S$ from the solvent. Samples were analyzed for relative concentrations of $H_2S$ and $CO_2$ by gas chromatography. The uncertainties in the measured concentrations of $H_2S$ and $CO_2$ are expected to be on the order of 5%. The results of these tests are given in Table 1.

Table 1 presents the experimental data for the distribution of $H_2S$ between the $CO_2$-rich phase and the solvent-rich phase for both TEG and Selexol solvent. The ratio of % w $H_2S$ in the solvent-rich phase (solvent-free basis) to the % w $H_2S$ in the $CO_2$-rich phase (solvent-free basis) is significantly higher for TEG than for Selexol solvent. For instance, at 31° C. and 915 psia, this ratio is 1.8 times as large in the TEG as in the Selexol solvent. An important consideration in interpreting these data is that $CO_2$ is several times more soluble in Selexol solvent under these conditions than in TEG (See Example II). Increasing the $CO_2$ concentration in the solvent-rich phases has the effect of diminishing the selectivity of the solvent for removing $H_2S$ from $CO_2$.

TABLE I

Measured Distribution of $H_2S$ between $CO_2$-Rich Phase and Solvent-Rich Phase

| Solvent | T, °C. | P, psia | SOLVENT-FREE % W $H_2S$ $CO_2$-Rich Phase (CRP) | Solvent-Rich Phase (SRP) | % w $H_2S$ in SRP / % w $H_2S$ in CRP |
|---|---|---|---|---|---|
| Selexol | 44 | 790 | 0.23 | 0.73 | 3.2 |
| Selexol | 37 | 830 | 0.33 | 0.89 | 2.7 |
| Selexol | 38 | 1130 | 0.30 | 0.65 | 2.2 |
| Selexol | 31 | 795 | 0.34 | 0.80 | 2.4 |
| Selexol | 31 | 915 | 0.33 | 0.82 | 2.5 |
| TEG | 32 | 1200 | 0.15 | 0.66 | 4.4 |
| TEG | 42 | 1200 | 0.28 | 0.99 | 3.5 |

EXAMPLE II

Data from EXAMPLE I were reduced to activity coefficients ($\gamma$-values) by numerous conversions and temperature extrapolations; these are detailed in Table 2. Below the solvent, temperature and pressure designations are separate sets of data dealing with $CO_2$ on the one hand and $H_2S$ on the other.

TABLE 2

Reduction of solubility and distribution data to activity coefficients for $CO_2$ and $H_2S$.

| Solvent: | Selexol | | | TEG | |
|---|---|---|---|---|---|
| Temp., °C. | 44 | 38 | 31 | 32 | 42 |
| Press., psia | 790 | 1130 | 915 | 918 | 1200 |
| $CO_2$ Data | | | | | |
| $CO_2$/Solv. | 1.28 | 3.47 | 2.49 | 0.33 | 0.25 |
| $CO_2$, Mol. Fract. | 0.56 | 0.78 | 0.71 | 0.25 | 0.20 |
| $\gamma$ | 1.33 | 1.24 | 1.30 | 3.5 | 4.76 |
| $H_2S$ Data | | | | | |
| $H_2S$/Solv. | 0.0122 | 0.0293 | 0.0266 | 0.0029 | 0.0032 |
| $H_2S$, Mol. Fract. | 0.0053 | 0.0065 | 0.0076 | 0.0022 | 0.0026 |
| $\gamma$ | 0.77 | 1.03 | 1.01 | 1.74 | 2.32 |

EXAMPLE III

An experimental and correlative program was carried out to furnish design data for the use of either Selexol or TEG solvent to selectively reduce small concentrations of $H_2S$ from produced $CO_2$ streams. This program consisted of 40 $CO_2$ solubility measurements and 25 $H_2S$ selectivity data covering 25°-60° C. and 250-1200 psia intervals. Solubility of approximately 80%M $CO_2$ in Selexol was achieved at 25°, 30°, 40° and 60° C. when pressures of $CO_2$ reached 750, 900, 1200 and 1400 psia, respectively; levels of 35%M $CO_2$ were obtained with TEG under roughly corresponding conditions. The two solvents furnish roughly comparable selectivities at the same $CO_2$ loadings, (concentrations of $CO_2$ in the liquids); however, at equal high $CO_2$ partial pressures (equal concentration of $CO_2$ in the high pressure gas), selectivities in the neighborhood of 4 were obtained with TEG and 2-3 were obtained with Selexol.

What is claimed is:

1. A process for simultaneously removing $H_2S$ and $H_2O$ from a gas stream containing between about 90 and about 99.5 percent volume $CO_2$ and between about 0.01 and about 5 percent volume $H_2S$, which process comprises:
   (a) countercurrently contacting said gas stream at elevated pressure between about 1000 and 2000 psig in an absorption zone with a physical solvent selected from the group consisting of diethylene glycol, triethylene glycol, tetraethylene glycol and mixtures thereof, therein liberating a relatively dry $CO_2$-rich gas and a loaded $H_2S$-rich liquid absorbent solution;

(b) passing said loaded absorbent solution to a first flashing zone maintained at a pressure below the partial pressure of the $CO_2$ present in said loaded absorbent solution at a temperature present in said first flashing zone, therein liberating a gas stream comprising a major portion of relatively dry $CO_2$ and a minor portion of the $H_2S$ present in said loaded absorbent solution, producing a semi-loaded absorbent absorbent solution, compressing and recycling said gas stream to said absorption zone;

(c) passing said semi-loaded absorbent solution to at least one additional flashing zone maintained at a pressure lower than that of the preceding flashing zone at the temperature in said flashing zone, therein liberating a gas stream comprising a major portion of the $H_2S$ and a minor portion of the $CO_2$ present in said semi-loaded absorbent solution and producing a semi-lean absorbent solution; and (d) passing said semi-lean absorbent solution to a regeneration zone, therein further separating $H_2S$, $H_2O$ and $CO_2$ from said semi-lean absorbent solution, and returning the resulting lean absorbent solution to said absorption zone.

2. The process according to claim 1, wherein the relatively dry liberated $CO_2$-rich gas is compressed, cooled and recycled to the absorption zone.

3. The process according to claim 1, wherein the pressure in said first flashing zone is between about 300 psig and 600 psig and the pressure in said second flashing zone is between about 100 psig and 250 psig.

4. The process according to claim 1, wherein a portion of said semi-lean absorbent solution from step (c) is passed to said absorption zone.

5. A process for simultaneously removing $H_2S$ and $H_2O$ from a gas stream containing between about 90 and about 99.5 percent volume $CO_2$ and between about 0.01 and about 5 percent volume $H_2S$, which process comprises:

(a) countercurrently contacting said gas stream at elevated pressure between about 1000 and 2000 psig in an absorption zone with a physical solvent selected from the group consisting of diethylene glycol, triethylene glycol, tetraethylene glycol and mixtures thereof, therein liberating a relatively dry $CO_2$-rich gas and a loaded $H_2S$-rich liquid absorbent solution;

(b) passing said loaded absorbent solution to a first flashing zone maintained at a pressure below the partial pressure of the $CO_2$ present in said loaded absorbent solution at a temperature present in said first flashing zone, therein liberating a gas stream comprising a major portion of relatively dry $CO_2$ and a minor portion of the $H_2S$ present in said loaded absorbent solution, producing a semi-loaded absorbent absorbent solution, compressing and recycling said gas stream to said absorption zone;

(c) passing said semi-loaded absorbent solution to a second flashing zone maintained at a pressure lower than that of the first flashing zone at the temperature in said first flashing zone, therein liberating a gas stream comprising a major portion of the $H_2S$ and a minor portion of the $CO_2$ present in said semi-loaded absorbent solution and producing a semi-lean absorbent solution;

(d) compressing and cooling the liberated gas stream from step (c) and combining it with the liberated gas stream from step (b), and passing the semi-lean absorbent solution to a third flashing zone maintained at a pressure lower than that of the second flashing zone at the temperature in said second flashing zone, therein liberating a gas stream comprising $H_2S$ and $CO_2$ and producing a leaner absorbent solution;

(e) compressing and cooling the liberated gas stream from step (d) and combining it with the liberated gas stream from step (c), and passing the leaner absorbent solution to a fourth flashing zone maintained at a pressure lower than that of the third flashing zone at the temperature in said third flashing zone, therein liberating a gas stream comprising minor amounts of $H_2S$ and $CO_2$ and producing a very lean absorbent solution; and (f) passing said very lean absorbent solution to a regeneration zone, therein further separating $H_2S$ and $CO_2$ from said very lean absorbent solution to said absorption zone.

6. The process according to claim 5 wherein the relatively dry liberated $CO_2$-rich gas is compressed, cooled and recycled to the absorption zone.

7. The process according to claim 5, wherein the pressure in said first flashing zone is between about 300 psig and 600 psig, and the pressure in said second flashing zone is between about 100 psig and 250 psig.

8. The process according to claim 5, wherein the pressure in the third flashing zone is between about 40 and 80 psig.

9. The process according to claim 5, wherein the pressure in the fourth flashing zone is between about 15 and 35 psig.

10. The process according to claim 5, wherein a portion of the very lean absorbent solution from the fourth stage flashing zone is passed to said absorption zone.

* * * * *